United States Patent [19]
Gattner et al.

[11] 4,116,918
[45] Sep. 26, 1978

[54] MELAMINE RESIN AND DYE MIXTURES

[75] Inventors: Hans Gattner, Frankfurt (Main); Joachim Ribka, Offenbach (Main)-Bürgel, both of Fed. Rep. of Germany

[73] Assignee: Cassella Farbwerke Mainkur Aktiengesellschaft, Fed. Rep. of Germany

[21] Appl. No.: 583,174

[22] Filed: Jun. 3, 1975

[30] Foreign Application Priority Data

Jun. 5, 1974 [DE] Fed. Rep. of Germany ....... 2427097

[51] Int. Cl.² .............................................. C08L 79/00
[52] U.S. Cl. ................... 260/37 P; 260/17.3; 260/31.2 XA; 260/31.8 R; 260/33.4 R; 260/34.2; 260/39 R; 260/39 P; 260/860; 425/812
[58] Field of Search .............. 260/67.6 R, 33.4 R, 260/39 R, 39 P, 34.2, 37 NP, 37 P; 425/812

[56] References Cited
U.S. PATENT DOCUMENTS

| | | |
|---|---|---|
| 2,851,424 | 9/1958 | Switzer et al. .................. 252/301.3 |
| 2,938,873 | 5/1960 | Kazenas ........................... 252/301.2 |
| 3,487,048 | 12/1969 | Deuzeman ......................... 260/67.7 |
| 3,647,755 | 3/1972 | Giller ............................ 260/67.6 R |
| 3,812,051 | 5/1974 | Merkle et al. ................. 252/301.2 R |

FOREIGN PATENT DOCUMENTS

| | | |
|---|---|---|
| 813,154 | 9/1951 | Fed. Rep. of Germany. |
| 940,109 | 3/1956 | Fed. Rep. of Germany. |
| 2,046,496 | 3/1972 | Fed. Rep. of Germany. |
| 990,610 | 4/1965 | United Kingdom. |
| 1,030,268 | 5/1966 | United Kingdom. |

OTHER PUBLICATIONS

Penn, PVC Technology, 3 ed., (Applied Science 1971), pp. 270, 285–286.
Chem. Abs. 81:P14737(e); 81:P154737(e); 82:P157930(u); 82:P44362(s).

*Primary Examiner*—Thomas De Benedictis, Sr.
*Attorney, Agent, or Firm*—Connolly and Hutz

[57] ABSTRACT

Melamine-formaldehyde resins of high transparency, good light fastness and low solubility are prepared from heavily N-oxymethylated melamines highly etherified with $C_1$ to $C_2$ alkyl, by vented kneading in liquid form at 120°–160° C followed by curing, all without local overheating and without the application of kneading pressure to solidified resin. A self-cleaning kneader is used and the resin that is produced is highly suited for carrying fluorescent dyes and the like.

6 Claims, 3 Drawing Figures

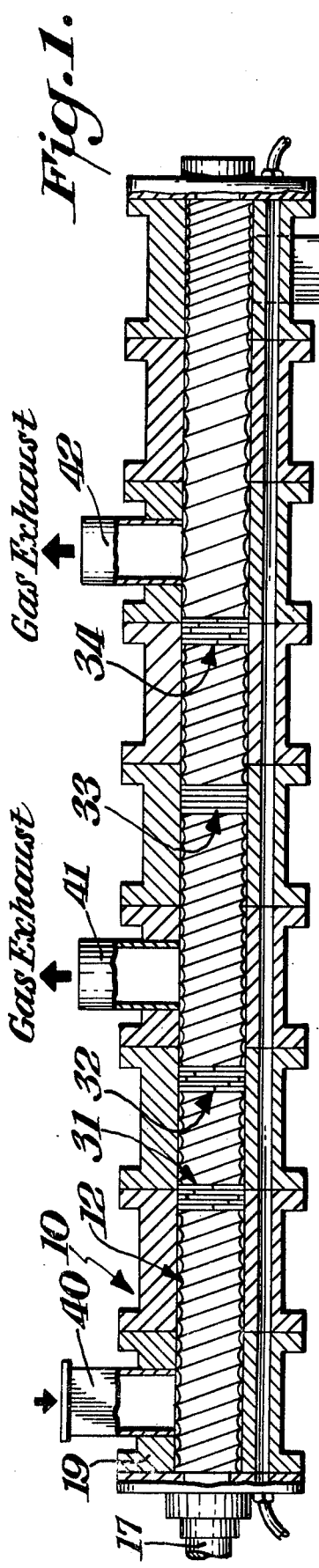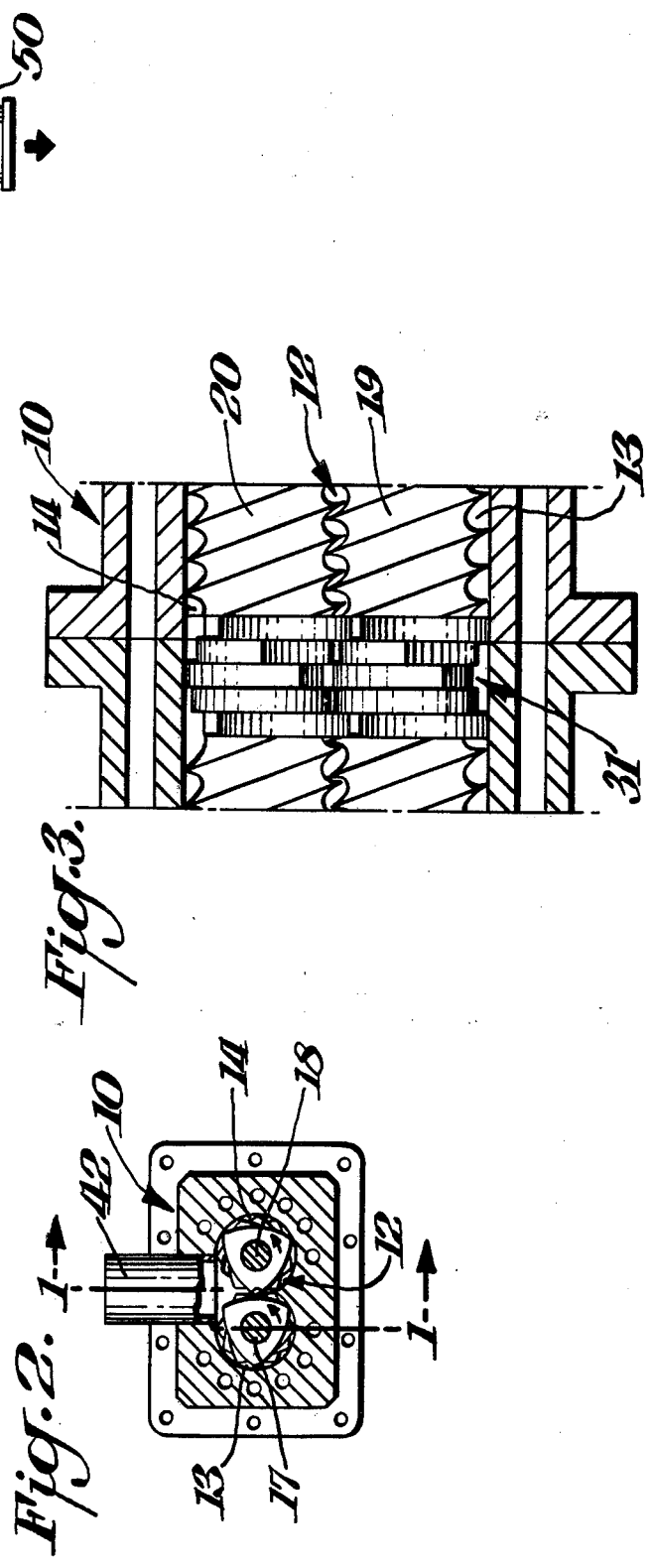

MELAMINE RESIN AND DYE MIXTURES

The present invention relates to melamine-formaldehyde resins and their preparation.

Among the objects of the present invention is the provision of novel melamine-formaldehyde resins that are of high transparency and also light-fast and free from yellowing.

Additional objects of the present invention include novel processes for preparing melamine-formaldehyde resins and novel products containing them.

The foregoing as well as further objects of the present invention are more fully discussed in the following description of several of its exemplifications, reference being made to the accompanying drawings in which:

FIG. 1 is a plan view, partly broken away, of a self-cleaning vented kneader that can be used to help prepare the melamine-formaldehyde resins of the present invention;

FIG. 2 is a sectional view of the kneader of FIG. 1 taken along line 2—2; and

FIG. 3 is an enlarged view of a kneader section on the apparatus of FIG. 1.

According to the present invention a light-fast melamine-formaldehyde resin of high transparency is prepared by the vented kneading of etherified oxymethyl melamine in liquid form at a temperature from about 120° C to about 160° C followed by curing, all without local overheating and without the application of kneading pressure to solidified resin. Very good results are obtained when there are at least three oxymethyl groups per melamine molecule, and at least two of those groups are etherified with $C_1$ to $C_2$ alkyl. For the most desirable results there should be at least five oxymethyl groups per melamine molecule, and at least four are etherified with $C_1$ to $C_2$ alkyl. $C_1$ alkyl, that is methyl, is better to use than $C_2$ alkyl.

The foregoing kneading is readily effected in a vented self-cleaning multiple-screw kneader, and the kneading is terminated before the liqui solidifies. The completion of the resinification is effected without subjecting the kneaded product to local overheating or to kneading pressure.

The resins of the present invention are extremely transparent, are not darkened or yellowed by ultraviolet light, and are particularly suited as carrier resins for fluorescent as well as white pigments. They also have desirable low solubilities in solvents such as water, xylene and acetone. Their solubility in water is not over about 2% by weight, and preferably not over about 0.5% by weight; their solubility in xylene is not over about 15% by weight and preferably not over about 0.2% by weight; this solubility in acetone is not over about 18% by weight, and preferably not over about 0.75% by weight.

The kneading of the present invention produces resins that are better than those obtained with unvented multiple-screw extruders as in German Offenlegungsschrift 2,046,496.

Fluorescent pigments are generally used by dispersing them in a thermosetting carrier resin and then milling the resulting pigment-containing resin into small particles. This is shown in U.S. Pat. No. 2,938,873 for instance, and as there pointed out it is important to use a carrier resin that is of light color and does not darken or yellow upon exposure to daylight. Other compositions of the dye and resin are shown in U.S. Pat. Nos. 2,498,592, 2,119,189 and 2,851,424. While melamine-formaldehyde resins are desirable for such carrier resins, it is difficult to manufacture them of uniform high quality. The technique of the present invention makes such manufacture practical.

The starting materials and equipment used according to the present invention are taken from the prior art. The etherified methylol melamines are described in U.S. Pat. Nos. 2,197,357, 2,998,410, 2,998,411, 3,322,762, 3,487,048, British Pat. Nos. 990,610 and 1,030,268, and vented self-cleaning multiple-screw kneaders are for example type ZSK and ZDS-K kneaders available from Werner & Pfleiderer in Stuttgart-Feuerbach, West Germany. Such a kneader is somewhat diagrammatically illustrated in the drawings.

As shown in FIG. 1, the kneader has an elongated housing 10 which may be jacketed or have a plurality of longitudinally-extending heat-exchange passageways for heating by steam. The housing 10 surrounds a twin-worm flow chamber 12 in the form of parallel overlapping cylinders 13, 14. A shaft 17 in cylinder 13 rotatably carries a worm extruder 19, and a similar shaft 18 in cylinder 14 rotatably carries a second worm extruder 20. The shafts are rotated in the same direction by a motor drive that is not illustrated, and at spaced intervals the extruder worms are interrupted and sets 31, 32, 33, 34 of kneader blocks are mounted on the shafts. The kneader blocks of each set are shown as three-lobed cams, those on one shaft interleaving with those on the other. The cam lobes are so shaped, as indicated in FIG. 2, that their apexes wipe against the wall of the flow chamber 12 and against the mating cam. This provides the self-cleaning action which is a feature of the present invention and which is explained in German Pat. Nos. 940,109 and 813,154. The worm portions wipe against the housing and the mating worm portion so that they are also self-cleaning.

Inlet 40 and outlet 50 provide for the introduction of the resinifying mixture into the flow chamber at one end of the equipment, and its discharge from the other end. Vents 41, 42 are located in the upper portion of the housing at points along the worm feed about equidistant between inlet and outlet and with respect to each other. As the shafts are rotated their worm portions push the introduced resinifying mixture, which is a viscous liquid, along the flow chamber and through the kneader blocks where the rapidly thickening liquid is worked to and fro as described in German Pat. No. 940,109. Best results are obtained with vents so located that the resinifying liquid is vented at least as frequently as about every half minute in its progress through the kneader, preferably right after emerging from a kneading section.

The venting and self-cleaning action of the kneader blocks as well as of the worms, contribute to provide the highly transparent light-fast resins of the present invention.

The resinifying feed is preferably free of water of condensation as well as of solvent. Suitably, the condensation is accelerated by the presence of up to 10%, referring to the weight of the starting product, of an acid catalyst such as p-toluene sulfonic acid, oxalic acid or phosphoric acid. At the beginning of the condensation care should be taken to vent vapors. Also the liquid starting material goes through a viscous-elastic phase in which the kneading must be carefully controlled if yellowing is to be avoided.

If the starting material is hardened without thorough mixing during the viscous-elastic stage, only inhomogeneous products result. The inhomogeneity of the products is attributable to differences in foaming of the composition as formaldehyde, which is generated but cannot escape sufficiently quickly through the thicker more viscous portions, polymerizes and undergoes caramelization.

Paddle type kneaders are not suitable for the mixing since here hardened solid tends to deposit on the kneading paddles and the housing walls in which they are contained, and some of the deposited solids adhere and become yellow. The same holds true of extruder worms and kneaders that do not have a distinct self-cleaning effect. In these machines any polymerizing solid that adheres to the equipment is subjected to heavy metal-to metal extruding or kneading pressures and discolors even more rapidly.

The novel melamine resin condensation products of the present invention are prepared without difficulty if the starting material is kneaded through its viscous-elastic phase in a self-cleaning vented kneader, and the kneading is completed before any solid phase forms. For this purpose durations of 0.5 to 6 minutes, and preferably 1 to 2 minutes, in the worm kneaders are normally required at temperatures of about 120° to about 160° C, and preferably about 130° to about 150° C.

During the vented kneading there is no noticeably localized overheating of the product due to the increasing effect of friction. The temperature and duration of stay in the preconvensation are selected in such a manner that the resin is quickly but guardedly condensed to such an extent that the granulate leaving the worm kneader is still soft or softly crumbly, while hot, so that it is not subjected to overheating due to friction in the worm or kneader section and it also does not cause any metal abrasion on the worm or kneader parts or the housing walls.

The partially condensed intermediate leaves the worm kneader hot, in the form of a soft crumbly, dustless and well-flowing granulate and immediately thereafter can be subjected to a frictionless further condensation in a suitable device at temperatures of about 120° to about 200° C, and preferably about 150° to about 180° C. No further mixing is needed but excessive pressures as by agitators are to be avoided. Devices suitable for this purpose are driers of various constructions, particularly disk, tumbling or worm driers, for example. A particularly suitable worm drier has internally heated twin screws that are spaced from each other to minimize friction and through which heat exchange fluid such as steam circulates counter-current to the flow of the drying resin granules. Such a worm drier is available from Lurgi in Frankfurt, West Germany, under the name "Holoflite". The postcondensation time is generally about 5 to about 120 minutes, and preferably about 25 to about 60 minutes.

As soon as the desired low degree of solubility and a sufficient millability are achieved, the postcondensation is stopped, the product cooled and subjected to further processing, which generally consists of milling the product in a suitable milling device, e.g. a roller, bead or sand mill, as in the prior art. Depending on the purpose intended, the novel melamine resin condensation product is milled to an average grain size of ca. 0.1 to 30μ (1μ = $10^{-4}$ cm), The solubilities are determined in that 10 g of the melamine resin condensation product, milled to an average grain size of 30μ, is vigorously agitated by means of a magnetic stirrer for 24 hours at 20° C with 100 g of the particular solvent, the residues drawn off, dried 24 hours in vacuum (ca. 14 Torr) at 40° C and then the weight loss is determined. If any solubility is excessive the resin granules are reheated to effect additional condensation.

By means of the present invention there are obtained non-melting, solvent-resistant, completely non-yellowing melamine resin condensation products with a high transparency and superior stability in light, and fast to bleeding. Also this is accomplished on a continuous rapid basis.

The properties of the novel melamine resin condensation products, particularly their hardness, brittleness and their plasticizing point, may be altered not only by the condensation conditions, particularly the temperature and the duration of the postcondensation, but also by the addition of various modifying agents to the starting product. Such modifying agents are particularly polyols, such as trimethylol propane, glycerin, pentaerythritol, sorbitol, cane sugar, methylglucoside, also aromatic or aliphatic polyesters containing free hydroxyl groups.

These modifying agents may be added singly or in mixtures to the starting product or to the composition of starting material in combined amounts of up to 501%. referring to the total weight of the starting material.

The novel melamine resin condensation products particularly because of their high transparency, freedom from yellowing, solvent fastness, heat stability bleeding fastness and superior stability in light, are outstandingly suitable as carrier resins for organic and inorganic dyes and pigments, particularly for organic fluorescent pigments. For the preparation of these products soluble or insoluble organic or inorganic dyes and/or pigments are admixed with the starting material prior to the condensation, optionally in combination with the modifying agents. It is also posible to add the dyes and pigments to the chemicals used for preparing the starting materials.

All organic fluorescent dyes, particularly those which are fluorescent to daylight and which are soluble or dispersible in the resinfiable starting materials, can be used as can dyes that react with melamine or with methylol melamine or with the ehterified methylol melamine. The monomeric starting material not yet mixed with an acid catalyst can be rapidly heated to temperatures up to about 140° C to help dissolve or react with the fluorescent dye, and either rapidly cooled again or promptly subjected to the kneading with or without the addition of the condensation catalyst.

Fluorescent dyes of the rhodamine or sulfo-rhodamine series, and preferably xanthene derivatives or naphthalimide or naphthalimide derivatives, are examples of those that may be employed. Mixtures of various fluorescing dyes may also be used.

The resulting dye-containing particles of the present invention are pigments that fluoresce in daylight and are superior to the corresponding prior art products, particularly with reference to solvent resistance, heat stability, bleeding fastness and stability in light. Furthermore they may be prepared in a simple manner.

These pigments, luminous by day, may be used for various purposes. For example, they may be employed for the preparation of fluorescent printing inks, coating media and lacquers. Fluorescent printing inks may be printing inks, photogravure printing inks, screen-printing-offset-litho inks, for example. Because of their high heat stability, the daylight-luminous pigments are also suitable for the fluorescent dyeing of plastics and enamels. Alkyd or acrylic lacquers effectively use such pigments. Depending on the purpose of application, the daylight-luminous pigments of the present invention are milled dry or wet to an average grain size of 0.1 to 30$\mu$. Generally, the concentration of the fluorescent dyes in the daylight-luminous pigment is 0.1 to 10% by weight.

In addition to the fluorescent dyes, other organic or inorganic dyes, such as organic pigments of the phthalocyanine series, for example, or white pigments, or optical brighteners may be incorporated in the novel melamine resin condensation products of the present invention. Optical brighteners are dyes that absorb only in the ultraviolet portion of daylight, and fluoresce in the visible range. Such dyes are desirably mixed with other organic or inorganic dyes or pigments, particularly pigments such as titanium dioxide. In this manner especially brilliant white colors are obtained. Special effects are also obtained with such combinations in paper coating compositions and in textile printing.

Generally the concentration of the organic or inorganic dyes or pigment combinations in the finished resin is 0.1 to 40% by weight although fluorescent dyes, as mentioned above, are by themselves best held to the range of 0.1 to 10% by weight. The condensation of the present invention is generally accompanied by about 20% by weight loss of volatile constituents, so that there are added to the starting materials 0.08 to 32% by weight organic or inorganic dye composition or 0.08 to 8% by weight fluorescent dyes.

The novel melamine resin condensation products of the present invention are also suitable as fillers for synthetics, rubber, paper, dye lakes, etc. Partially hardened but millable condensation products in paper, synthetics, lacquers, printing pastes give high-grade products with better fastness.

The degree of the hardening or condensation may be influenced by the condensation requirements, particularly by the temperature and duration of the postcondensation. High temperatures and/or long times in the postcondensation yield extensively hardened novel melamine resin condensation products, while low temperatures, e.g. 120° to 140° C and/or short times, yield partially hardened novel melamine resin condensation products which may be millable to have the above-mentioned low solubilities in water, xylene and acetone but still contain reactive groups.

The following examples further explain the invention, temperatures being given in centigrade degrees and percentages in percent by weight.

EXAMPLE 1

A monomeric hexamethylolmelamine pentamethyl ether was mixed at room temperature with 2% by weight p-toluene sulfonic acid as the catalyst and delivered by means of a gear-type metering pump at the rate of about 15 kg/h to the twin screw worm kneader heated to ca. 145° C of Werner & Pfleiderer, Type ZDS-K, illustrated in the drawings, and preheated to about 145° C. The shafts were operated at a speed that effected discharge of the kneaded material in 2 minutes. As discharged from the worm kneader the hot resin was in a soft-crumbly form and if permitted to cool solidified to a hard, millable, colorless granulate.

The still hot, soft-crumbly granulate was transferred immediately from the worm kneader to a disk drier whose disks were heated to about 160° C. After 45 minutes the final product was removed from the disk drier and was milled to the desired grain size. The solubility of the milled particles was:

in acetone — 0.18% by weight
in xylene — 0.08% by weight
in water — 0.13% by weight and the particles were quite colorless.

EXAMPLE 2

The monomeric melamine of Example 1 was first heated together with 1% by weight methoxybenzoxanthene dicarboxylic acid hydrazide (prepared according to Example 20 of German Offenlegungsschrift 1,770,818) for about 2 hours at 135° C until solution was complete and after adding 2% by weight p-toluene sulfonic acid, the mixture was condensed as indicated in Example 1.

After the usual milling there was obtained a daylight-luminous pigment which had excellent fastness properties, more particularly an excellent stability in light and the same solubilities as the product of Example 1.

EXAMPLE 3

Example 2 was repeated with 0.2% of the optical brightener, 1,4-bis-[5'-carbomethoxy-benzoxazolyl-(2')]-naphthalene substituted for the dye used in Example 2. There was obtained a white pigment which, used in textile printing, had a considerably better luminosity and higher degree of whiteness in comparison to the titanium dioxide customarily employed. This white pigment had the same solubilities as the product of Example 1.

EXAMPLE 4

Example 2 was again repeated, this time with 1% by weight of the blue phthalocyanine pigment, Hostapermblau A2R, in place of the dye of Example 2. There was obtained a blue pigment fluorescing in daylight and with solubilities identical to those of the product of Example 1.

EXAMPLE 5

A monomeric trimethylolmelamine trimethyl ether was condensed in accordance with the procedure of Example 1 but without catalyst, the ether having been preheated to about 70° C in order to liquefy it. There was obtained a well-millable product suitable as a filler for paper coating compositions and molded articles. Its solubilities were as follows:

in acetone — 0.35% by weight
in xylene — 0.02% by weight
in water — 0.34% by weight

EXAMPLE 6

Example 1 was again repeated, this time with the postcondensation in the disk drier carried out at 130° C and not at 160° C. There was obtained a millable melamine resin condensation product which still contained reactive groups and was suitable for the cross-linking of polyesters or polyacrylates containing hydroxyl groups, and also suitable as a reactive filler for paper and molded articles. It had the following solubilities:

in acetone — 16.9% by weight
in xylene — 14.6% by weight
in water — 1.8% by weight Particularly advantageous starting products for the preparation of melamine resin carriers for daylight fluorescent pigments are the highly methylolated and almost completely methyletherified monomeric melamine resins with 5 to 6 methylol groups and 4 to 6 methylether groups which are solvent-free and still liquid at room temperature, such as pentamethylolmelaminepentamethyl ether, pentamethylolmelamine tetramethyl ether, hexamethylolmethylolmelamine tetramethyl ether, hexamethylolmelamine pentamethyl ether, and hexamethylolmelamine hexamethyl ether, for example.

The kneading blocks or cams can have a different number of lobes. Thus they can have two lobes each, as shown in German Pat. No. 813,154. There can also be more or less than four sets of kneading sections in the kneader used with the present invention. By way of example, two sets of such kneader blocks can be used, with venting after each set. Also each set is shown in the drawings as having five kneading blocks on each screw shaft, and the number of such blocks per set can likewise be varied as from three to ten. Moreover the arrangemet for heating the kneader can be widely varied and if desired electric resistance heater units can be secured to the kneader housing.

Should the kneading action proceed for too long a time, the resin emerging from the kneader outlet will be hard and frequently discolored. When this happens the rate of rotation of the kneader shafts is increased to speed up the movement of the resin through the preliminary condensation stage. Speeds greater than five revolutions per second are not desirable. Much of the extrusion portion of the worm feeding arrangement in the construction of the drawings can be eliminated, but some should be retained to help move the viscous resinifying material through the kneader sections.

Obviously many modifications and variations of the present invention are possible in the light of the above teachings. It is therefore to be understood that within the scope of the appended claims the invention may be practiced otherwise than as specifically described.

What is claimed:

1. A process for the preparation of a light-fast melamine resin which process comprises kneading at a temperature from about 120° to about 160° C in a self-cleaning vented multiple-spiral kneader, a resinifying liquid etherified melamine-formaldehyde adduct in which the melamine has at least 3 oxymethyl groups per molecule and at least 2 of these groups are etherified with a $C_1$ or $C_2$ alkyl, completing the kneading before the liquid becomes solid, then completing the resinification at a temperature no higher than 200° C and in the absence of significant super-atmospheric pressure.

2. The combination of claim 1 in which the kneading is effected at a temperature within the range of about 130° to about 150° C, and the final resinification at a temperature within the range of about 150° to about 180° C.

3. The combination of claim 1 in which the liquid etherified melamine-formaldehyde adduct is essentially free of volatile solvents.

4. The combination of claim 1 in which the liquid etherified melamine-formaldehyde adduct contains plasticizer for the completely resinified product.

5. The combination of claim 1 in which the liquid etherified melamine-formaldehyde adduct contains a dispersed coloring material.

6. The combination of claim 5 in which the coloring material is methoxybenzoxanthene dicarboxylic acid hydrazide fluorescent dye.

* * * * *